(12) United States Patent
Ford et al.

(10) Patent No.: US 7,706,267 B2
(45) Date of Patent: Apr. 27, 2010

(54) NETWORK SERVICE MONITORING

(75) Inventors: Daniel E. Ford, Granite Bay, CA (US);
Steven V. Britt, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 428 days.

(21) Appl. No.: 11/714,596

(22) Filed: Mar. 6, 2007

(65) Prior Publication Data
US 2008/0222730 A1 Sep. 11, 2008

(51) Int. Cl.
*H04L 12/26* (2006.01)
(52) U.S. Cl. ..................................... 370/230
(58) Field of Classification Search ................ None
See application file for complete search history.

(56) References Cited

U.S. PATENT DOCUMENTS

| | | | |
|---|---|---|---|
| 7,124,197 B2 | 10/2006 | Ocepek et al. | |
| 7,290,283 B2 * | 10/2007 | Copeland, III | 726/25 |
| 2002/0023160 A1 * | 2/2002 | Garrett et al. | 709/229 |
| 2006/0123133 A1 | 6/2006 | Hrastar | |
| 2006/0167871 A1 | 7/2006 | Sorenson et al. | |
| 2006/0190993 A1 | 8/2006 | Noble | |
| 2007/0058645 A1 * | 3/2007 | Nannra et al. | 370/401 |

* cited by examiner

*Primary Examiner*—Chirag G Shah
*Assistant Examiner*—Amarnauth Persaud

(57) ABSTRACT

Network devices, systems, and methods are described that perform network service monitoring. One method includes examining a number of packets received by a first network device to determine whether a protocol of a packet corresponds to a given network service, forwarding an event to a second network device in response to a determination that the protocol of the packet corresponds to the network service, determining whether the network service is an authorized service by comparing the network service to a list of network services, and executing a remedial action in response to a determination that the network service is an unauthorized service.

11 Claims, 5 Drawing Sheets

400

| Ver | IHL | Type of Service | Total Length | | |
|---|---|---|---|---|---|
| Identification | | | Flag | Fragment Offset | |
| TTL | | Protocol 430 | Header Checksum | | IPv4 Header |
| Source IP Address 420 | | | | | |
| Destination IP Address 440 | | | | | |
| 450 Source Port | | | Destination Port 460 | | |
| Sequence Number | | | | | |
| Acknowledgment Number | | | | | |
| Offset | Rsv | ECN | Cont. Bits | Window | TCP Header |
| Checksum | | | Urgent Pointer | | |

*Fig. 4*

NETWORK SERVICE MONITORING

BACKGROUND

Computing systems can include multiple computing devices such as servers, desktop PCs, laptops, and workstations, and peripheral devices, (e.g., printers, facsimile devices, and scanners). In some systems, these network devices can be networked together across a local area network (LAN), wireless LAN, and/or wide area network (WAN) via routers, hubs, switches, and the like to form a computing device network. A LAN and/or WAN uses clients and servers that have network-enabled operating systems such as Windows, Mac, Linux, and Unix.

Computing device network environments can include various network services such as dynamic host configuration protocol (DHCP) services, domain name system (DNS) services, authentication services, email services, and/or directory services, among various other network services.

Network administrators (NAs) and security analysts continually face the challenge of locating unauthorized, e.g., rogue, services that can be used by unauthorized users, e.g., hackers, to compromise network security. Rogue services can interfere with an authorized version of the service and can be used to maliciously disrupt network and/or other information technology operations.

In some situations, a NA may not become aware of a rogue network service until the network begins exhibiting problems or disruptions due to the rogue service. Therefore, it can be beneficial to monitor network services in order to detect and/or suppress rogue network services as soon as possible to reduce and/or prevent such services from causing problems or disruptions to the network.

BRIEF DESCRIPTION OF THE DRAWINGS

FIG. 4 provides an example illustration of bit definitions for an IP packet, including the fields within an IP and TCP header.

DETAILED DESCRIPTION

Figure 1:
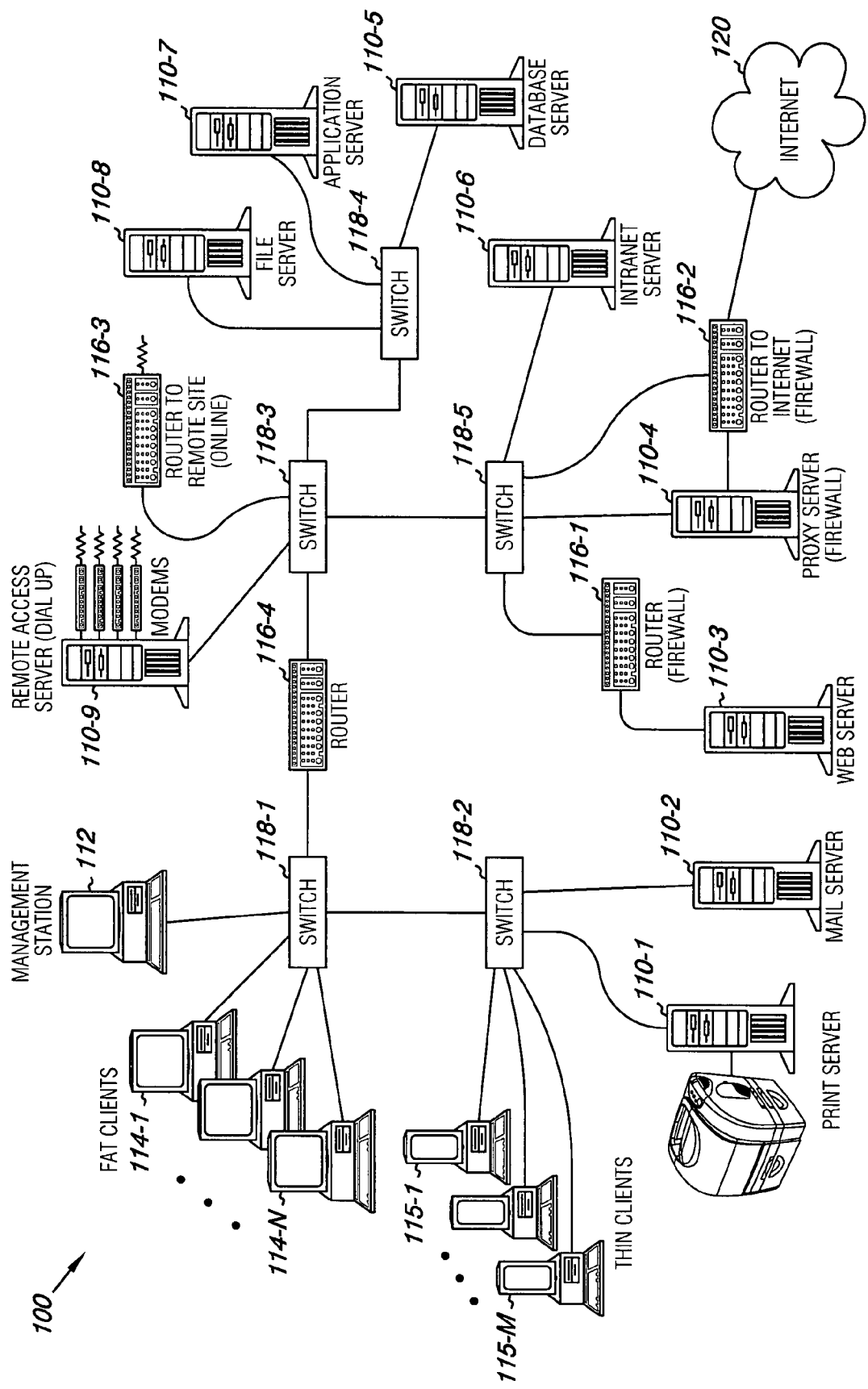
FIG. 1 illustrates an example of a computing device network in which embodiments can be implemented.

Embodiments of the present invention may include various systems, methods, and non-transitory computer readable media for network service monitoring. The embodiments may include examining a number of packets received by a first network device, e.g., a switch, router, a server, or a hub, among various other network devices, to identify packets corresponding to network services, e.g., "network service packets." Network services can include, but are not limited to, address translation services, address assignment services, and routing services, among various other network services. Examples of such network services can include DHCP services, DNS services, and gateway services, to name a few. Various packet information can be used to determine whether the packets correspond to network services, e.g., to determine whether a packet corresponds to a particular network service and/or to distinguish between different network services and/or service types.

In some embodiments, a packet protocol included in a packet header can be used to determine whether a particular packet corresponds to a network service. For instance, a packet having a header "protocol" field indicating a DHCP protocol, a DNS protocol, or a ARP protocol can correspond to a DHCP service, a DNS service, or a gateway service, respectively. In some embodiments, a port number, e.g., a source and/or destination port, included in a packet header can be used to determine whether a packet corresponds to a network service. For instance, a packet having a header "source port" field indicating port 68 can correspond to a DHCP service, e.g. a DHCP request. Embodiments are not limited to a particular type of packet information used to determine whether a packet corresponds to a network service.

The embodiments may include forwarding an event, e.g., an alert such as an SNMP trap and/or other notification, to a second network device, e.g., a network management station (NMS), in response to a determination that a packet corresponds to a network service. In various embodiments, the event can include packet service type information and/or packet address information associated with the packet. Packet service type information can include information indicating a particular network service such as a DHCP service, and/or information indicating a type of the service, e.g., a DHCP request/reply. Packet address information can include information such as a source and/or destination IP address of the packet that can indicate from and/or to where the packet was sent and/or is going.

In various embodiments, the event, e.g., packet service type information and/or packet address information, can be used to determine whether a network service is an authorized service and/or whether a provider of the network service is an authorized network service provider. For instance, in various embodiments, determining whether the network service is an authorized service can be accomplished by comparing the packet service type information to a list of network services. In various embodiments, the list includes a number of authorized service types and a number of authorized service provider addresses associated with the authorized service types.

The embodiments of the present invention may include initiating and/or executing a remedial action in response to a determination that the network service is an unauthorized service and/or in response to a determination that the provider of the network service is an unauthorized provider. In some embodiments, the remedial action can be an action among a number of actions of a remedial action policy. The remedial action policy can be preconfigured by a network administrator and may depend on the type of unauthorized network service. For example, the remedial action policy may include initiating and/or executing a particular remedial action for one type of unauthorized network service and a different remedial action for another type of unauthorized network service.

As described further below in reference to FIGS. 1-5, various embodiments of the present invention can provide for continuous monitoring of network traffic to automatically detect network services and classify the detected services as rogue or authorized. In such embodiments, remedial actions to correct and/or contain services determined to be rogue, e.g., unauthorized, can be automatically initiated without network administrator intervention.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like. As used herein a "network device" means a switch, router, hub, bridge, etc., i.e., a device having processor and memory resources and connected to a network 100, as the same will be understood by one of ordinary skill in the art. Although a switch will often be used in this disclosure as an exemplary device, those skilled in the art will realize that embodiments of the invention may be implemented with other network devices. As the reader will appreciate, the term network device can also be used to refer to servers, PCs, etc., as illustrated further below.

The embodiment of FIG. 1 illustrates clients and servers in a LAN. The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, and a remote access server (dial up) 110-9. The examples described here do not provide an exhaustive list of servers that may be used in a network.

The embodiment of FIG. 1 further illustrates a network management station 112, e.g., server, PC, and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 1184, and 118-5, as the same are known and understood by one of ordinary skill in the art. The term "network" as user herein is not limited to the number and/or type of network devices illustrated in FIG. 1.

As one of ordinary skill in the art will appreciate, many of the network devices (e.g., switches 118-1, 118-2, 118-3, 118-4, 118-5 and/or hubs) can include a processor in communication with a memory and will include network chips having hardware logic, e.g., application specific integrated circuits (ASICs), associated with ports. By way of example and not by way of limitation, the network management station 112 includes a processor and memory. Embodiments of the various devices in the network are not limited to a number, type, or size of processor or memory resources.

Program instructions (e.g., computer executable instructions), as described in more detail herein, can reside on the various network devices. For example, program instructions in the form of firmware and/or software can be resident on the network 100 in the memory of a network management station 112 and/or one or more routers, 116-1, 116-2, 116-3, 116-4, hubs, and/or switches 118-1, 118-2, 118-3, 1184, 118-5, and can be executable by the processor(s) and/or logic (e.g., hardware in the form of transistor gates) thereon. Also, program instructions can be resident in a number of locations on various network devices in the network 100 as can be employed in a distributed computing network. As used in this disclosure, a "distributed computing network" means the use of multiple computing devices in a network to execute various roles in executing instructions, e.g., application processing, etc., as described above. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc. More description for the same is not provided here so as not to obscure embodiments of the invention.

As one of ordinary skill in the art will understand, embodiments of the present invention can be performed by software (as the same has been described above), hardware in the form of logic, and/or application modules (i.e., a self-contained hardware or software components that interacts with a larger system) on the systems and devices shown herein or otherwise. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device. Embodiments, described herein, are not limited to a particular operating environment or to executable instructions composed in a particular programming language or syntax. Instructions suitable for carrying out embodiments of the present invention, can be resident in one or more devices or locations or in several and even many locations.

Figure 2:
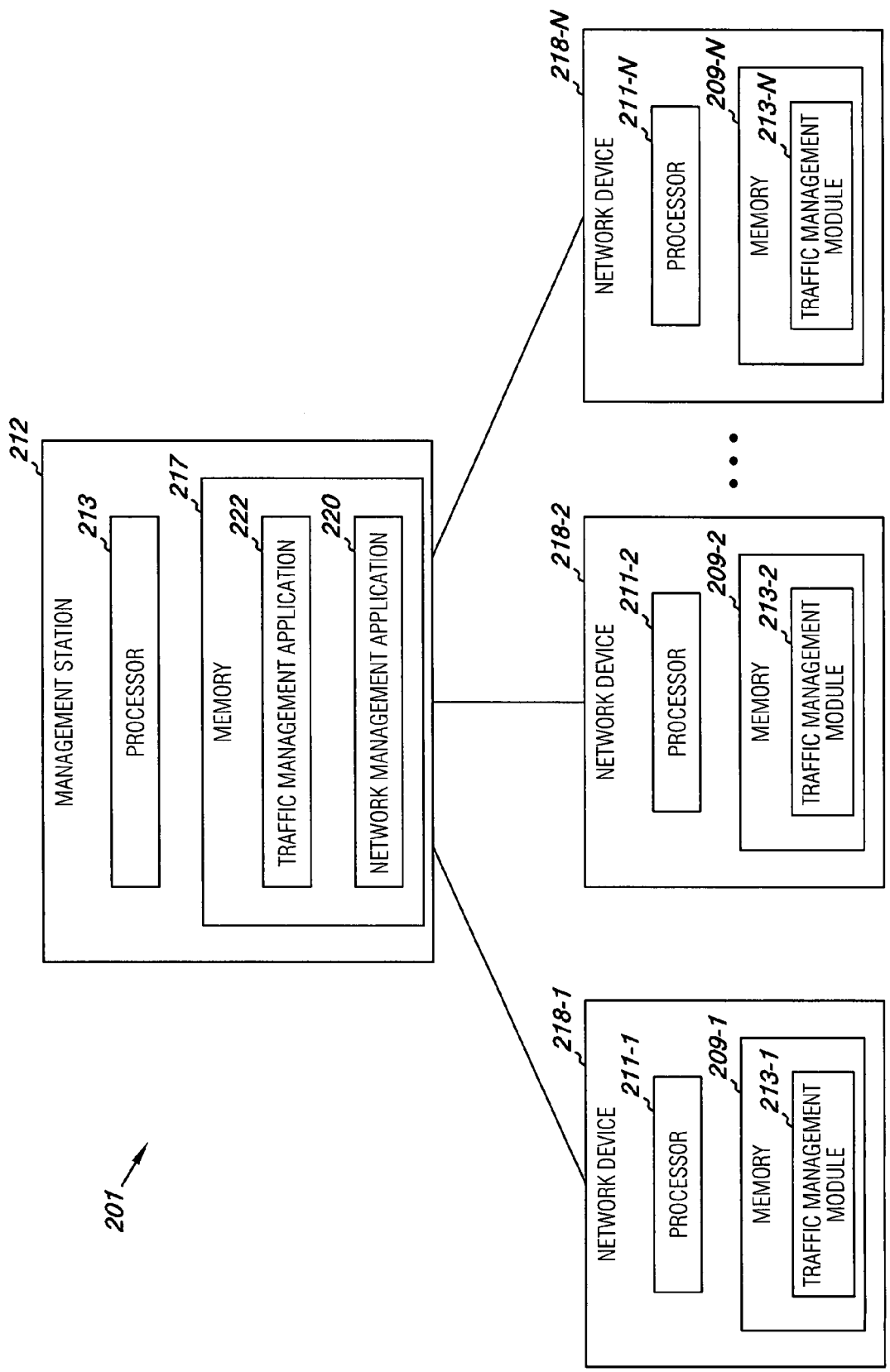
FIG. 2 illustrates an embodiment of a network service monitoring system.

FIG. 2 illustrates a network service monitoring system 201 according to an embodiment of the present invention. In various embodiments, the system 201 is a portion of a computing device network, e.g., network 100 shown in FIG. 1. In the embodiment illustrated in FIG. 2, the system 201 includes a network management station (NMS) 212, e.g., management station 112 shown in FIG. 1, including a processor 213 coupled to memory 217. In various embodiments, and as illustrated in FIG. 2, the NMS 212 includes one or more network management applications (NMAs) 220 and/or traffic management applications (TMAs) 222, e.g., computer executable instructions such as software, that can be stored on memory 217 and executed by processor 213 to perform various network management functions as described herein. In various embodiments, the TMA 222 can reside on another network device, e.g., as a software agent on a managed device such as managed device 218-1, 218-2, . . . , 218-N among various other network devices managed by NMS 212.

In various embodiments, a NMA 220 can be executed to monitor and/or control various devices networked to NMS 212. In the embodiment illustrated in FIG. 2, the NMS 212 is networked to a number of managed nodes, e.g., network devices 218-1, 218-2, . . . , 218-N. The network devices 218-1, 218-2, . . . , 218-N can be routers, switches, or servers, such as switches 118-1, 118-2, 118-3, 118-4, and 118-5 described in FIG. 1, among various other network devices capable of being managed by NMS 212.

As illustrated in FIG. 2, the network devices 218-1, 218-2, . . . , 218-N can include a respective processor 211-1, 211-2, . . . , 211-N and memory resources 209-1, 209-2, . . . , 209-N. In various embodiments, and as shown in FIG. 2, the network devices 218-1, 218-2, . . . , 218-N include respective traffic management modules (TMMs) 213-1, 213-2, . . . , 213-N. The TMMs 213-1, 213-2, . . . , 213-N, or management agents, can be software agents in the form of computer executable instructions that are stored on memory 209-1, 209-2, . . . , 209-N and executed by a processor 211-1, 211-2, . . . , 211-N to perform network management operations according to various embodiments as described herein. The TMMs 213-1, 213-2, . . . , 213-N can also be implemented on the hardware of respective devices 218-1, 218-2, . . . , 218-N. As an example, a TMM 213-1, 213-2, . . . , 213-N can include an sFlow agent or other mechanism capable of capturing network traffic.

In various embodiments, the traffic management modules 213-1, 213-2, . . . , 213-N can be executed by a processor, e.g., 211-1, 211-2, . . . , 211-N, to capture packets, or samples thereof, received to the respective network device 218-1, 218-2, . . . , 218-N. The captured packets or samples of the packets can be sent to a device on which a TMA, e.g., 222, is being executed. As one of ordinary skill in the art will appreciate, the TMMs 213-1, 213-2, . . . , 213-N can be executed to forward copies of captured packets and/or portions thereof, e.g., packet header information such as header 400 shown in FIG. 4. As noted above, the TMA 222 can reside on various other network devices, such as network device 218-1, 218-2, . . . , 218-N among other network devices, e.g., various network devices such as servers 110-5, 110-6, 110-7 and/or 110-8 shown in FIG. 1.

In various embodiments, the traffic management application 222 can be executed by a processor, e.g., 213, to examine network traffic received to the respective network device 218-1, 218-2, . . . , 218-N. The network traffic can include copies of packets or portions thereof captured and forwarded to the TMA 222 via a traffic management module, e.g., 213-1, 213-2, . . . , 213-N. As described in detail in connection with FIGS. 3 and 5, the TMA 222 can be executed to determine whether packets received to devices 218-1, 218-2, . . . , 218-N are network service packets, e.g., packets corresponding to a given network service. In various embodiments, the TMA can be executed to examine packet headers, e.g., header information 400 shown in FIG. 4, to determine whether a protocol of the packet corresponds to a given network service, e.g., to determine if the packet is from a network service such as a DHCP service, a DNS service, a default gateway service, among other network services.

In various embodiments, the TMA 222 can be executed to determine whether a first packet among a number of packets received by the network device 218-1, 218-2, . . . , 218-N is a network service packet, transmit a first event indicating a first network service if the first packet is a network service packet, determine whether a second packet among the number of packets is a network service packet, and transmit a second event indicating a second network service if the second packet is a network service packet. The first and second network service packets can correspond to different network services, e.g., the TMA 222 can distinguish between different network service types.

Figure 3:
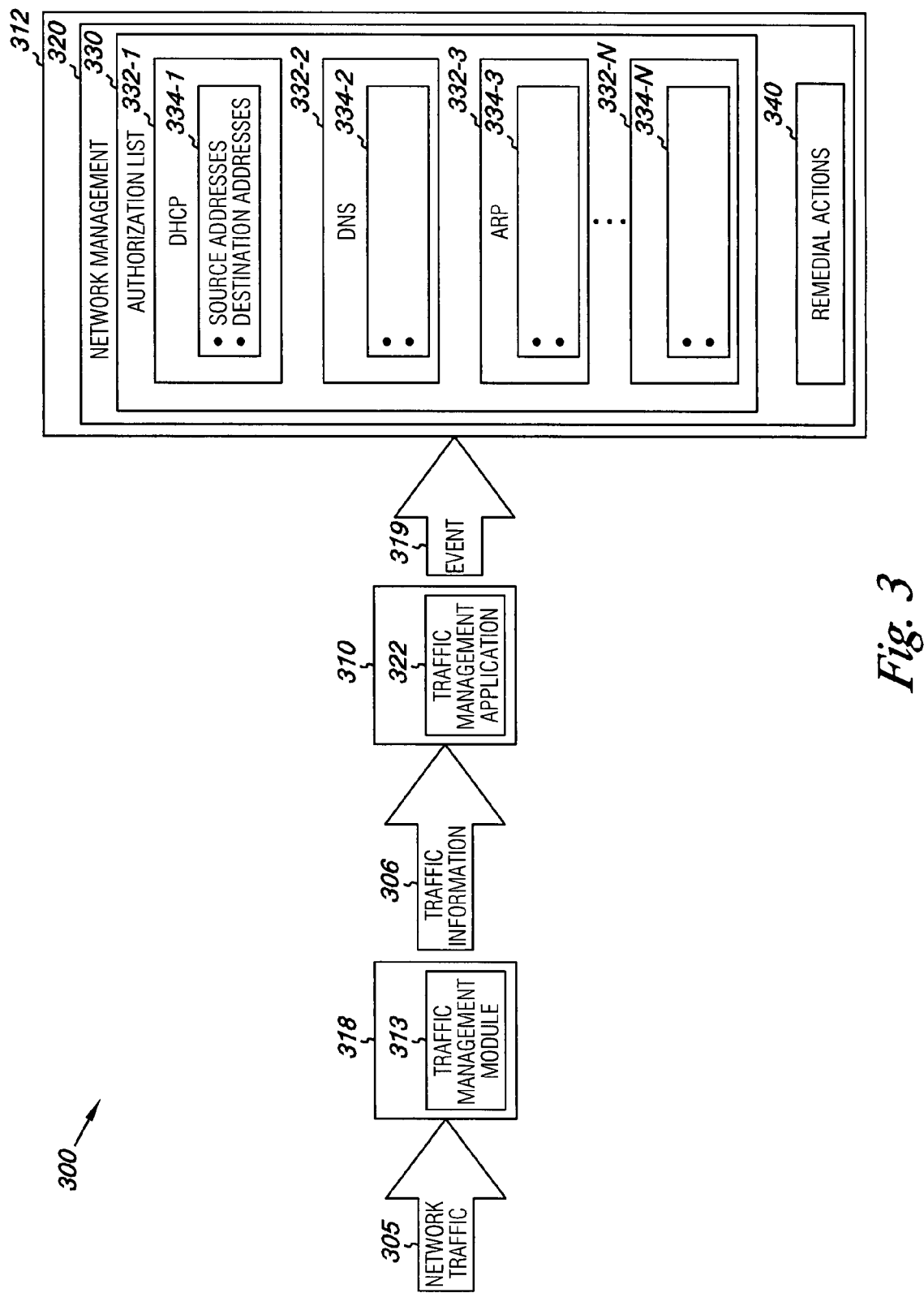
FIG. 3 illustrates a functional flow diagram for a network service monitoring embodiment.

In various embodiments, computer executable instructions, e.g., NMA 220, stored to the memory 217 can be executed by the processor 213 to receive the first and second event, determine whether the first network service is an authorized network service by comparing the first network service to a list of network services, and determine whether the second network service corresponds to an authorized network service by comparing the second network service to the list, e.g., list 330 described in connection with FIG. 3.

In various embodiments, the events e.g., notifications such as SNMP traps, are forwarded from the device on which the TMA 222 resides, e.g., NMS 212 in this embodiment, to the NMA 220 in response to a determination that the protocol of the packet corresponds to a network service, e.g. in response to a determination by the TMA 222 that the packet is a network service packet. The events can include information such as packet service type information and/or packet address information that can be used by the NMS 212 to determine whether the network service is an authorized service.

In various embodiments, computer executable instructions can be executed to initiate a remedial action in response to a determination that the network service is an unauthorized service. For example, instructions associated with NMA 220 and/or TMA 222 can be executed by processor 213 to initiate a first remedial action if the first network service is an unauthorized network service, and to initiate a second remedial action if the second network service is an unauthorized network service.

In various embodiments, initiating a remedial action can include executing a remedial action policy, e.g., remedial action policy 340 shown in FIG. 3, which can include a number of remedial actions to be taken. In some embodiments, the remedial action policy can include executing different remedial actions depending on factors such as the type of unauthorized network service. That is, the first and second remedial actions can be different. However, in some embodiments, the first and second remedial actions can be the same. As described further in connection with FIG. 3, in some embodiments, the number of remedial actions can be part of a preconfigured remedial action policy that includes a number of remedial actions which depend on a type of unauthorized service.

FIG. 3 illustrates a functional flow diagram 300 for network service monitoring according to an embodiment of the present invention. In the embodiment illustrated in FIG. 3, network traffic 305 is received to a traffic management module (TMM) 313, e.g., TMM 213-1, 213-2, . . . , 213-N described in FIG. 2. The TMM 313 resides on a network device 318 and is a packet capturing mechanism, e.g., an sFlow agent, that can capture packets and forward portions and/or copies thereof, e.g., 306, to a traffic management application (TMA), e.g., TMA 322. As stated above, the network device 318 can be a network switch, e.g., 118-1, 118-2, and/or 118-3 shown in FIG. 1, among various other network devices.

In the embodiment illustrated in FIG. 3, the traffic management application (TMA) 322 is used to perform various network traffic monitoring and/or management functions such as examining network traffic information 306 received from TMM 313. As one of ordinary skill in the art will appreciate a traffic management module 313, can send copies of less than entire packets, e.g., packet headers, and/or can send copies of samples of packet traffic to be examined and/or analyzed by a traffic management application 322.

The TMA 322 resides on a network device 310. In various embodiments, the device 310 can be a server such as servers 110-5, 110-6, 110-7, and/or 110-8 shown in FIG. 1. As described above in connection with FIG. 2, the TMA 322 can also reside on a NMS, e.g., NMS 212 as shown in FIG. 2, among various other network devices. The TMA 322 can include computer executable instructions storable on a memory and executable by a processor to perform various network traffic management functions described herein.

The network traffic information 306 can be copies of packets, e.g., IP packets, including headers such as header 400 shown in FIG. 4. The headers of traffic information 306 can include various fields, e.g., fields 420, 430, 440, 450, and 460 shown in FIG. 4, which the TMA 322 can use to determine whether the packets are network service packets. That is, the TMA 322 can use the traffic information 306 forwarded from the TMM 313 to determine whether the network traffic 305 received to network device 318 includes network service packets. As an example, the TMA 322 can examine the protocol field, e.g., field 430 shown in FIG. 4, to determine the packet protocol, e.g., TCP, UDP, ICMP, etc. The TMA 322 can use the determined packet protocol and port information of the packet, e.g., source port information 450 and/or destination port information 460 shown in FIG. 4, to identify and/or distinguish between network service types. For instance, under the IANA (Internet Assigned Numbers Authority) standard, if the packet protocol, e.g., field 430 shown in FIG. 4, of a particular packet is TCP and the destination port, e.g., field 460, is port 53, then the TMA 322 can determine that the particular packet corresponds with a DNS service.

In various embodiments, the TMA 322 can determine an address, e.g., a source and/or destination IP address of a device sending and/or receiving a network service packet. For example, the TMA 322 can examine the packet address information, e.g., source IP address field 420 and/or destination IP address field 440 shown in FIG. 4, to determine the IP address of the device, e.g., switch, router, server, etc., which sent and/or is to receive the particular packet.

In various embodiments of the present invention, information obtained from network traffic information 306 by TMA 322 can be used to determine whether a network service is an authorized or unauthorized service of a network, e.g., network 100 shown in FIG. 1, and/or to determine whether a provider of the service, e.g., a provider device such as a server, is an authorized or unauthorized service provider. In the embodiment shown in FIG. 3, computer executable instructions are executed such that an event 319 is generated by TMA 322 and forwarded to a network management application (NMA) 320. The NMA 320 can be stored on a memory of, and executed by a processor of, a network management station 312, e.g., NMS 212 shown in FIG. 2. As shown in FIG. 2, in some embodiments, the NMA 320 and TMA 322 can reside on the same network device, e.g., NMS 212. However, embodiments are not so limited.

The event 319 can be a notification such as a SNMP trap that can be automatically transmitted to NMA 320 upon a determination by TMA 322 that a packet is a network service packet. That is, in various embodiments, instructions can be executed to forward the event 319 to NMA 320 without a specific request from the NMS 312. The event 319 can include information such as, but not limited to packet service type information and packet address information. The packet service type information can include information indicating whether the packet is a particular type of service, e.g., a DNS service, a DHCP service, or a gateway service and/or a particular protocol associated with the network service, e.g., DNS, DHCP, ARP, among others. The packet address information can indicate information such as, but not limited to the source address of the packet and the destination address of the packet.

In various embodiments of the present invention, computer executable instructions can be executed to determine whether the network service is an authorized service by comparing the network service to a list of network services. As illustrated in FIG. 3, the NMA 320 and/or computer executable instructions associated therewith can be executed to receive the event 319 from the TMA 322. The NMA 320 can include a list 330, e.g., a table or other data structure, of network services and/or protocols associated therewith. In the embodiment illustrated in FIG. 3, the list 330 includes a number of entries 332-1, 332-2, 332-3, . . . , 332-N. In this embodiment, the entries include protocols corresponding to types of network services. That is, entry 332-1 includes protocol "DHCP" corresponding to a DHCP service, entry 332-2 includes protocol "DNS" corresponding to a DNS service, and entry 332-3 includes protocol "ARP" corresponding to a gateway service such as a default gateway.

In various embodiments, and as shown in FIG. 3, the entries 332-1, 332-2, 332-3, . . . , 332-N in list 330 can include address information 334-1, 334-2, 334-3, . . . , 334-N. The address information 334-1, 334-2, 334-3, . . . , 334-N can include service type address information such as one or more source addresses and/or one or more destination addresses, e.g., IP addresses, associated with the respective network services and/or service types 332-1, 332-2, 332-3, . . . , 332-N. In some embodiments, the list 330 can be a precompiled list of network service types 332-1, 332-2, 332-3, . . . , 332-N and/or addresses 334-1, 334-2, 334-3, . . . , 334-N.

As an example, the source addresses of list 330 can be IP addresses of network devices authorized to provide the particular network service and the destination addresses can be IP addresses of network devices authorized to receive the particular network service. For instance, address information 334-1 associated with entry 332-1 can include IP addresses of network devices authorized to provide and/or receive a DHCP service. Similarly, address information 334-2 associated with entry 332-2 can include IP addresses of network devices authorized to provide and/or receive a DNS service, and address information 334-3 associated with entry 332-3 can include IP addresses of network devices authorized to provide and/or receive a gateway service using ARP.

In the embodiment illustrated in FIG. 3, the list 330 is a list of authorized entries. That is, the entries 332-1, 332-2, 332-3, . . . , 332-N include authorized network services, and the associated address information 334-1, 334-2, 334-3, . . . , 334-N includes authorized IP addresses. However, as the reader will appreciate, in various embodiments of the present invention, the list 330 can include unauthorized network services and/or unauthorized address information. That is, the list 330 can be a "blacklist" in some embodiments.

In various embodiments of the present invention, the NMA 320 can determine whether a network service is an authorized service by comparing service type information from the forwarded event 319 to the list 330. For instance, if the service type information of event 319 indicates that the packet is a DNS packet, then the NMA 320 can determine that the packet corresponds to an authorized service since entry 332-1 of list 330 includes the DNS service type. In this example, if the list 330 did not include a DNS entry, e.g., the DNS service type was not in the list, then the NMA 320 would determine the packet to correspond to an unauthorized network service.

In various embodiments, a packet determined to correspond to an authorized network service, e.g., a network service type on list 330, may still be determined by NMA 320 to correspond to an unauthorized service provider. For instance, in the example above, even if the event 319 indicates that the packet corresponds to a DNS service, e.g., the packet type information of the event 319 matches the service type 332-2, the address information forwarded in the event 319 may not match the address information 334-2. For instance, the provider of the network service, e.g., the network device that is performing the DNS service and that sent the particular DNS packet, may not be an authorized network service provider despite the service being an authorized network service. In such cases, the NMA 320 can determine that service provider to be unauthorized by comparing the address information from event 319 to the appropriate address information 334-1, 334-2, 334-3, . . . , 334-N in list 330.

In various embodiments of the present invention, instructions can be executed to determine that a remedial action should be initiated in response to a determination that the network service is an unauthorized service and/or in response to a determination that the network service is an unauthorized network service provider. Remedial actions can include inhibiting, e.g., disabling or rate limiting, network traffic from a port where the unauthorized service provider is connected, applying an access control list (ACL) to restrict the unauthorized service and/or provider, or sending a notification email to a network administrator indicating the type of unauthorized service and/or IP address of the unauthorized provider, among various other remedial actions.

In various embodiments, the execution of a remedial action can be based on a remedial action policy, e.g., a set of executable instructions 340 that can be executed to implement one or more remedial actions. The remedial action policy 340 can be executed by the NMA 320 when a service and/or service provider is determined to be unauthorized. In various embodiments, the remedial action policy 340 can include a number of different remedial actions such as those described above. In such embodiments, the policy 340 can include initiating and/or executing different remedial action policies depending on factors such as the type of unauthorized network service and/or IP address related thereto. That is, the policy 340 can cause the NMA 320 to initiate a particular remedial action if the unauthorized network service is a DHCP service, and a different remedial action if the unauthorized network service is a DNS service, for example. In various embodiments, the remedial action policy 340 can be preconfigured by a network administrator or other entity responsible for network management.

FIG. 4 provides an example illustration of bit definitions for an IP packet, including the fields within an IP and TCP header 400. As described above, network traffic, e.g., network traffic 305 shown in FIG. 3, can be received to and/or captured by a network device such as a switch or router. Traffic information, e.g., 306 shown in FIG. 3, can be forwarded by a traffic management module, e.g., TMM 313 shown in FIG. 3, to a traffic management application, e.g., TMA 322 shown in FIG. 3, and can be examined by the TMA.

In various embodiments, a traffic management application can extract information from the various fields of packet headers, e.g., header 400, which can be used for purposes such as determining whether packets correspond to a network service, e.g., identifying if a given packet is a network service packet, and/or distinguishing between different network service types. Examples of header fields that can be used by a traffic management application include a protocol field 430, a source IP address field 420, a destination IP address field 440, a source port field 450, and a destination port field 460. As an example, and as described above in connection with FIG. 3, a traffic management application can use the protocol field 430 and source port field 450 to determine a packet corresponding to a particular network service.

The source IP address information 420 and destination IP address information 440 can also be extracted from header 400 by a traffic management application, e.g., TMA 322 shown in FIG. 3, and can be forwarded to a network management application of a network management station, e.g., NMS 312 shown in FIG. 3, in order to determine whether an identified network service is an authorized network service and/or an authorized network service provider. Embodiments are neither limited to the examples provided nor to the particular example header 400 illustrated in FIG. 4. For example, header 400 can include a Universal Datagram Protocol (UDP) header, or an Ethernet header, among various other types of packet headers.

Figure 5:
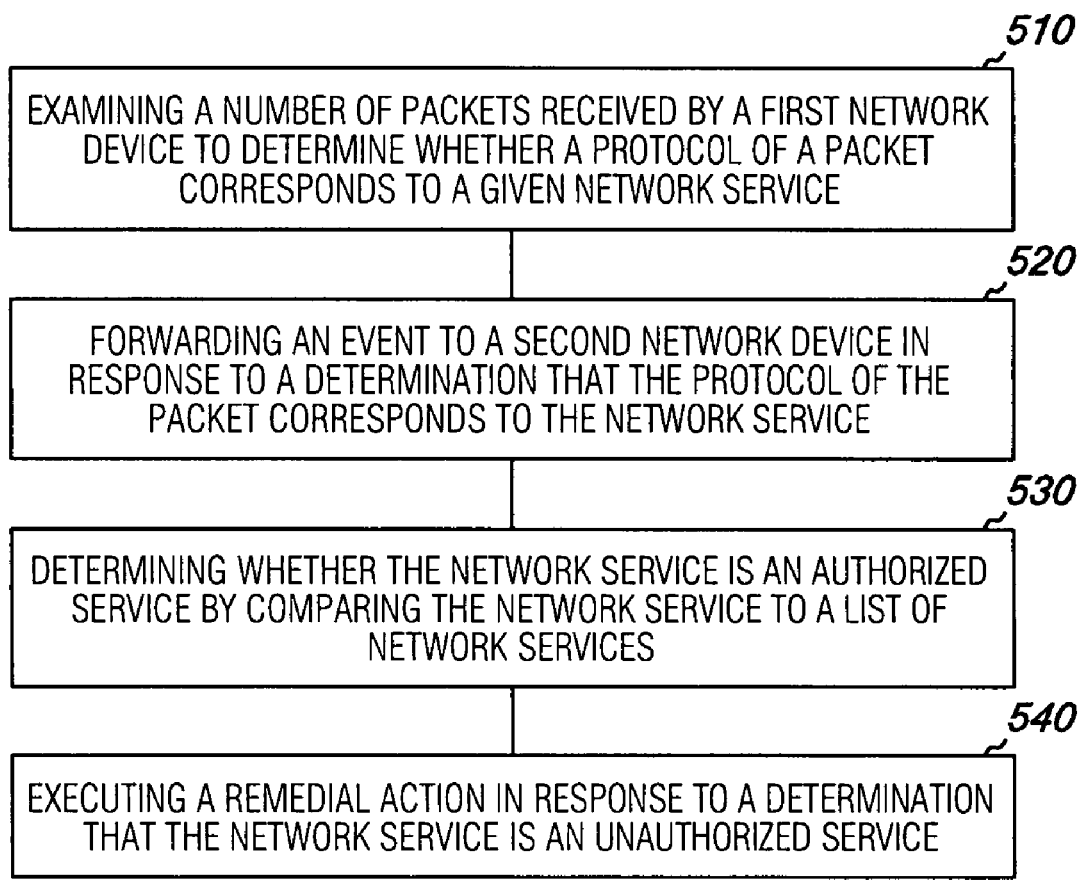
FIG. 5 illustrates a block diagram of a method for network service monitoring embodiment.

FIG. 5 illustrates a block diagram of a method for network service monitoring according to an embodiment of the present invention. As shown at block 510 of the embodiment illustrated in FIG. 5, the method includes examining a number of packets received by a first network device, to determine whether a protocol of a packet corresponds to a given network service. As described herein above, the first network device can be a switch or router that includes a packet capturing mechanism, e.g., a traffic management module, capable of capturing network traffic received to the device and forwarding traffic information to a traffic management application (TMA), e.g., TMA 322 shown in FIG. 3.

As described in FIG. 3, the traffic information, e.g., packet header information, forwarded from the first device to the TMA, can be examined by the TMA to determine whether the protocol of the packet received to the first device corresponds to a given network service. In some embodiments, the TMA can reside on the first network device. In some embodiments the TMA can reside on a network management server (NMS), e.g., NMS 212 as shown in FIG. 2. As shown in FIG. 3, the TMA can also reside on a network device different than the NMS and first network device.

As shown at block 520, the method illustrated in FIG. 5 can include forwarding an event to a second network device in response to a determination that the protocol of the packet corresponds to the network service. For instance, as shown in FIG. 3, an event 319 can be forwarded to a NMS 312 in response to a determination by TMA 322 that the protocol of a packet 305 received to network device 318 corresponds to a network service. That is, the second network device can be a network management station such as NMS 112, 212, and/or 312 as shown in FIGS. 1, 2, and 3, respectively. In various embodiments, the event forwarded to the second network device can include information such as packet service type information and packet address information.

As shown at block 530, the method illustrated in FIG. 5 can include determining whether the network service is an authorized service by comparing the network service, e.g., the network service as determined by the TMA and included in the event, to a list of network services, e.g., list 330 as described in connection with FIG. 3. In various embodiments, the method can include determining whether the provider of the network service is an authorized service provider by comparing the packet address information included in the event to a list of addresses.

As shown at block 540, the method illustrated in FIG. 5 can include executing a remedial action in response to a determination that the network service is an unauthorized service. As described in connection with FIG. 3, the remedial action can be one of a number of remedial actions of a remedial action policy which can be automatically initiated by an NMS, e.g., NMS 112, 212, and/or 312. In various embodiments, the remedial action policy can be initiated in response to a determination that the provider to the network service is an unauthorized service provider.

Unless explicitly stated, the method embodiments described herein are not constrained to a particular order or sequence. Additionally, some of the described method embodiments can occur or be performed at the same point in time.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of various embodiments of the invention, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed:

1. A method for monitoring network services, comprising:
examining a number of packets received by a first network device to determine whether a protocol of a packet corresponds to a given network service;
transmitting an event including packet service type information and packet address information to a second network device in response to a determination that the protocol of the packet corresponds to the given network service, the packet address information being selected from the group of: a source address of the packet and a destination address of the packet;
determining whether the network service is an authorized service by comparing information contained in the event to information in a list of network services on the second network device and by comparing the packet service type information to a number of entries in the list including a service type and an associated service type address;
executing a remedial action in response to a determination that the network service is an unauthorized service;
determining whether a provider of the network service is an authorized provider by comparing the packet address information to the number of entries in response to a determination that the network service is an authorized service; and
executing the remedial action in response to a determination that the provider of the network service is an unauthorized provider.

2. The method of claim 1, wherein determining whether the network service is an authorized service includes comparing service type information from the transmitted event to the list.

3. The method of claim 1, wherein the remedial action is selected from a number of remedial actions, and wherein a particular remedial action executed is based on a service type of the unauthorized service.

4. The method of claim 1, wherein the method includes distinguishing between a number of different network services by using the protocol and a port of the packet.

5. A non-transitory computer readable medium including computer executable instructions stored thereon that can be executed by a computing device to perform a method, comprising:
examining a number of packets received by a first network device to identify packets corresponding to network services;
transmitting an event to a second network device in response to a packet identified as corresponding to a network service, the event including packet service type information and packet address information associated with the packet;
determining whether the network service is an authorized service by comparing the packet service type information to a list of entries on a second network device including:
a number of authorized service types; and
a number of authorized service provider addresses associated with the authorized service types;
executing a remedial action policy in response to a determination that the network service is an unauthorized service;
determining whether a provider of the network service is an authorized provider by comparing the packet address information to the list, the packet address information selected from the group of:
a source address of the packet; and
a destination address of the packet; and
executing the remedial action policy if the source address of the packet does not match an authorized service provider address.

6. The medium of claim 5, wherein executing the remedial action policy includes executing an action based on a type of the unauthorized service.

7. The medium of claim 5, wherein examining the number of packets includes identifying packets corresponding to network services selected from the group of:
a dynamic host configuration protocol (DHCP) service;
a domain name system (DNS) service; and
a gateway service.

8. The medium of claim 5, wherein examining the number of captured packets to determine packets corresponding to network services includes distinguishing between different network service types by identifying a protocol of the packets.

9. A network monitoring system, comprising:
a first network device including a memory coupled to a processor, and computer executable instructions stored to the memory and executed by the processor to:
determine whether a first packet among a number of packets received by the network device is a network service packet;
transmit a first event to a second network device indicating a first network service if the first packet is a network service packet;
determine whether a second packet among the number of packets is a network service packet; and
transmit a second event to the second network device indicating a second network service if the second packet is a network service packet; and
a network management station (NMS) on the second network device, networked with the first network device, the NMS including a memory coupled to a processor, and computer executable instructions stored to the memory and executed by the processor to:
receive the first and second event;
determine whether the first network service corresponds to an authorized network service by comparing information contained in the first event with information in a list of network services on the second network device;
determine whether the second network service corresponds to an authorized network service by comparing information contained in the second event with information in the list of network services on the second network device; and
initiate a first remedial action if the first network service is an unauthorized network service;
wherein:
the NMS includes computer executable instructions stored in memory and executed by the processor to initiate a second remedial action if the second network service is an unauthorized network service;
the first event indicates a first network service provider address and the second event indicates a second network service provider address and the list includes a number of authorized network service provider addresses associated with the network services; and the NMS includes computer executable instructions stored in the memory and executed by the processor to;
- determine whether the first network service provider address is on the list if the first network service is determined to correspond to an authorized network service;
- determine whether the second network service provider address is on the list if the second network service is determined to correspond to an authorized network service;
- inhibit network traffic associated with the first network service provider address if the first network service provider address is not on the list; and
- inhibit network traffic associated with the second network service provider address if the second network service provider address is not on the list.

10. The system of claim 9, wherein the first and second network services are different network services.

11. The system of claim 9, wherein the first network device includes computer executable instructions stored in the memory and executed by the processor to determine whether the first packet and the second packet are network service packets by examining a port of the first and the second packet.

\* \* \* \* \*

UNITED STATES PATENT AND TRADEMARK OFFICE
CERTIFICATE OF CORRECTION

| | | |
|---|---|---|
| PATENT NO. | : 7,706,267 B2 | Page 1 of 1 |
| APPLICATION NO. | : 11/714596 | |
| DATED | : April 27, 2010 | |
| INVENTOR(S) | : Ford et al. | |

It is certified that error appears in the above-identified patent and that said Letters Patent is hereby corrected as shown below:

In column 13, line 3, in Claim 9, delete "to;" and insert -- to: --,

Signed and Sealed this
Eighteenth Day of January, 2011

David J. Kappos
*Director of the United States Patent and Trademark Office*